(12) United States Patent
Ishikawa et al.

(10) Patent No.: US 7,792,033 B2
(45) Date of Patent: *Sep. 7, 2010

(54) BANDWIDTH POLICING METHOD AND PACKET TRANSFER APPARATUS WITH BANDWIDTH POLICING FUNCTION

(75) Inventors: Yuichi Ishikawa, Machida (JP); Takeki Yazaki, Hachioji (JP); Takeshi Aimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,981

(22) Filed: Jul. 31, 2008

(65) Prior Publication Data

US 2008/0298234 A1  Dec. 4, 2008

Related U.S. Application Data

(63) Continuation of application No. 10/874,549, filed on Jun. 24, 2004, now Pat. No. 7,420,917.

(30) Foreign Application Priority Data

Jul. 17, 2003  (JP) .............................. 2003-198184

(51) Int. Cl.
G01R 31/08 (2006.01)
H04L 12/28 (2006.01)
H04J 3/16 (2006.01)
G06F 15/173 (2006.01)

(52) U.S. Cl. ................. 370/232; 370/235.1; 370/395.2; 370/468; 709/224

(58) Field of Classification Search ................. 370/230, 370/232, 235, 235.1, 468; 709/224

See application file for complete search history.

(56) References Cited

U.S. PATENT DOCUMENTS

6,052,379 A  4/2000  Iverson et al.

(Continued)

FOREIGN PATENT DOCUMENTS

JP  11/088343  9/1997

(Continued)

OTHER PUBLICATIONS

J. Heinanen et al., "A Two Rate Three Color Marker", Network Working Group, The Internet Society, Sep. 1999, pp. 1-4.

(Continued)

*Primary Examiner*—Dang T Ton
*Assistant Examiner*—Ryan C Kavleski
(74) *Attorney, Agent, or Firm*—Stites & Harbison PLLC; Juan Carlos A. Marquez, Esq.

(57) ABSTRACT

In a bandwidth policing apparatus which accommodates a large number of user groups, bandwidth policing for each user group is performed at high speed. When there is any extra bandwidth in bandwidth for a user group, the contracted committed information rate for each user is guaranteed invariably while using this effectively. The bandwidth policing apparatus accumulates packets of a plurality of user groups under bandwidth policing in the same packet accumulate FIFO. Also, for a packet which does not exceed the contracted bandwidth for each user, the contracted bandwidth for each user is guaranteed by deciding that the packet does not exceed the contracted bandwidth for each user group.

7 Claims, 11 Drawing Sheets

U.S. PATENT DOCUMENTS

| | | |
|---|---|---|
| 6,456,593 B1 | 9/2002 | Iverson et al. |
| 6,600,785 B1 * | 7/2003 | Nishigori et al. ....... 375/240.23 |
| 6,643,260 B1 | 11/2003 | Kloth et al. |
| 6,870,812 B1 | 3/2005 | Kloth et al. |
| 6,920,109 B2 | 7/2005 | Yazaki et al. |
| 7,280,560 B2 | 10/2007 | Bruckman et al. |
| 7,327,682 B2 | 2/2008 | Gandhi et al. |
| 2002/0181484 A1 * | 12/2002 | Aimoto ...................... 370/413 |
| 2003/0016808 A1 * | 1/2003 | Hu et al. ................ 379/221.03 |
| 2004/0057378 A1 | 3/2004 | Gronberg |
| 2004/0066746 A1 | 4/2004 | Matsunaga |
| 2006/0146708 A1 | 7/2006 | Kanazawa |
| 2006/0164988 A1 | 7/2006 | Mishra et al. |

FOREIGN PATENT DOCUMENTS

| | | |
|---|---|---|
| JP | 2001-326688 | 5/2000 |
| WO | WO 02/052800 A1 | 12/2001 |
| WO | WO 02/065711 A1 | 2/2002 |

OTHER PUBLICATIONS

JPO Office Action mailed Sep. 4, 2007, in Japanese with English translation.

* cited by examiner (i) IN CASE THAT CONTRACTED BANDWIDTH FOR EACH USER GROUP IS A PEAK INFORMATION RATE (ii) IN CASE THAT CONTRACTED BANDWIDTH FOR EACH USER GROUP IS A COMMITTED INFORMATION RATE

FIG. 11

| | POLR-A1 | TS-A1 | CNT-A1 | TOSC-A1 | TOSN-A1 | QC-A1 | QN-A1 | DROP-A1 |
|---|---|---|---|---|---|---|---|---|
| 11-1 THR-A1 | | | | | | | | |
| 11-2 THR-A2 | POLR-A2 | TS-A2 | CNT-A2 | TOSC-A2 | TOSN-A2 | QC-A2 | QN-A2 | DROP-A2 |
| 11-6 THR-B3 | POLR-B3 | TS-B3 | CNT-B3 | TOSC-B3 | TOSN-B3 | QC-B3 | QN-B3 | DROP-B3 |

FIG. 12

| | POLR-A | TS-A | CNT-A | TOSC-A | TOSN-A | QC-A | QN-A | DROP-A |
|---|---|---|---|---|---|---|---|---|
| 12-1 THR-A | | | | | | | | |
| 12-2 THR-B | POLR-B | TS-B | CNT-B | TOSC-B | TOSN-B | QC-B | QN-B | DROP-B |

BANDWIDTH POLICING METHOD AND PACKET TRANSFER APPARATUS WITH BANDWIDTH POLICING FUNCTION

CROSS-REFERENCE TO RELATED APPLICATION

This application is a Continuation of nonprovisional U.S. application Ser. No. 10/874,549 filed on Jun. 24, 2004 and issued as U.S. Pat. No. 7,420,917 to Ishikawa et al. on Aug. 13, 2008. Priority is claimed based on U.S. application Ser. No. 10/874,549 filed on Jun. 24, 2004, which claims the priority of Japanese Application 2003-198184 filed on Jul. 17, 2003, all of which is incorporated by reference.

INCORPORATION BY REFERENCE

The present application claims priority from Japanese application JP2003-198184 filed on Jul. 17, 2003, the content of which is hereby incorporated by reference into this application.

FIELD OF THE INVENTION

The present invention relates to a control method and a transfer apparatus of packet, and in particular, to a bandwidth policing method and a bandwidth policing apparatus which police the bandwidth of packet flowing into a network.

BACKGROUND OF THE INVENTION

In packet type communication modes used in the IP (Internet Protocol) network such as the Internet it is possible to reduce the communication cost more than the conventional dedicated line because a large number of users can share the line. Taking advantage of this low cost a request has risen to apply speech data, mission critical data of companies, etc. which conventionally flew on dedicated line to the IP network. Consequently, in the conventional IP network where the Best Effort type service was the mainstream there has been increasing a need to realize the communication quality such as low delay, low discard rate which the dedicated line has.

One of the services which realize the communication quality is the GFR (Guaranteed Frame Rate) which is defined as the ATC (ATM Transfer Capability) of the ATM (Asynchronous Transfer Mode) network. In the GFR it is possible to utilize the bandwidth effectively by allowing the communication exceeding the committed information rate if there is any extra bandwidth as well as guaranteeing the contracted committed information rate.

The need of the bandwidth control will be described referring to FIG. 3. Here, FIG. 3 is an example to show the configuration of a network and it is needless to say that it is applicable to both of the prior art and the present invention. In FIG. 3 output line of edge node C1 is shared by flows from both of ISP (Internet Service Provider)'s network A and ISP's network B. Consequently, it tends to be a degradation point of the communication quality when congestion occurs in communication line. Therefore, the bandwidth control is needed for transfer packet at the edge node C1.

For the bandwidth control, first, it is needed to police the contracted committed information rate for each user and guarantee it. This is to guarantee the communication quality of accommodated users A1~A3 of the ISP's network A. At the same time, it is necessary to police and limit the peak information rate as a user group A which is a group binding the users A1~A3 to prevent congestion and protect the bandwidth resource in carrier's backbone network. Here, each of the users A1~A3 can send and receive packets using the extra bandwidth even when they have used up the committed information rate guaranteed for each of them, unless they exceed the peak information rate as user group A. Also, for the purpose of reduction of accommodation cost per user group, a plurality of user groups are accommodated in the edge node C1 and bandwidth policing is performed for each user group.

In Japanese Patent Application Laid-Open No. JP-A-2001-326688 (hereinafter it is called prior art 1) a shaping apparatus which guarantees the committed information rate for each user is disclosed. In the prior art 1 the continuous Leaky Bucket Algorithm (hereinafter it is called a leaky bucket algorithm) which is a bandwidth policing algorithm of cells which are fixed length packets in the ATM is used as a bandwidth policing algorithm extended to the variable length packet of the IP. The leaky bucket algorithm is a model of a leaky bucket which has a certain depth and a hole, and while the bucket contains water in it the water continues to leak in policed bandwidth and when a packet is input water in an amount of byte length of the packet is poured. The bucket has a certain depth to allow an arrival swing of packet, and the input packet is handled as a packet of which bandwidth does not exceed (keep) the contracted bandwidth while the bucket does not overflow, and when the bucket overflows the packet is handled as a packet of which bandwidth exceeds (violate) the contracted bandwidth.

FIG. 1 is a conceptual diagram of a shaping apparatus cited from the prior art 1. The shaping apparatus shown in FIG. 1 is assumed to be implemented between packet switching means which performs internal transmit processing of received packet and a packet transmit circuit which transmits processed packet.

When a packet arrives at a shaper unit 100 a discard controller 110 decides "accumulation" or "discard" of the arrived packet. A packet accumulate FIFO (First In First Out) 120 accumulates packet which is decided to be "accumulation" and transmits the packet in bandwidth which is equal to or greater than a total sum of the contracted committed information rate for each user. A bandwidth policing unit 130 checks the bandwidth for each user and handles a packet within the committed information rate as a high priority packet and handles the other as a low priority packet. By setting FIFO threshold for a high priority packet deeper than FIFO threshold for a low priority packet, it is possible to protect the high priority packet by deciding the high priority packet to be "transferred" with high priority and guarantee the committed information rate for each user. Here, FIFO is a kind of memory which accumulates packets, and it refers to a memory which has the structure in which it is possible to fetch data stored previously in order of the storage when stored data is fetched and used, or to such a storage method.

Applying the shaping apparatus of the prior art 1 to the edge node C1 of FIG. 3, the above-mentioned bandwidth control is possible. By the bandwidth policing unit 130, the bandwidth policing of the packet is performed for each received packet user and the discrimination of high priority packet/low priority packet is performed. A packet which is accommodated within the committed information rate is processed as a high priority packet. Namely, its queuing priority for the packet accumulate FIFO 120 is set to high. On the other hand, a packet which exceeds the committed information rate for each user is processed as a low priority packet. Namely, its queuing priority for the packet accumulate FIFO 120 is set to low. Thereby, the guarantee of the committed information rate for each user can be realized.

Also, the limitation of peak information rate of packet user group can be realized by setting packet transmit bandwidth from the packet accumulate FIFO 120 to an arbitrary value. Here, the packet which is to be accumulated in the packet accumulate FIFO 120 is limited to a packet of specified user group, for example, a packet of user group A. Namely, the shaper 100 is designed depending on the number of user groups.

In RFC2698 of the Internet Society, it is disclosed 2 Rate 3 Color Marker (hereinafter it is referred to as prior art 2) as a discrimination method for discriminating packets. In FIG. 2 a processing flow of the prior art 2 is shown in a flow chart. In the prior art 2, first, it is decided whether bandwidth occupied by user packet for each user exceeds the peak information rate or not, and if the bandwidth exceeds the peak information rate, the packet is decided to be a discard packet and the packet is discarded. If the bandwidth does not exceed the peak information rate, next, it is decided whether the bandwidth occupied by user packet for each user exceeds the committed information rate or not. If the bandwidth exceeds the committed information rate, the packet is decided to be a low priority packet and, as a sanction, for example, it is regarded as a packet which is to be discarded with high priority at the time of congestion by setting its queuing priority to low. If the bandwidth does not exceed the committed information rate, the packet is decided to be a high priority packet and its queuing priority is set to high so that it becomes hard to be discarded even at the time of congestion.

When trying to accommodate a plurality of user groups in the shaping apparatus disclosed in the prior art 1, to limit the peak information rate for each user group, it is needed to limit the transmit bandwidth from the packet accumulate FIFO less than or equal to the peak information rate by providing a packet accumulate FIFO for each user group. Therefore, as the number of accommodated user groups increases the number of packet accumulate FIFOs necessary to be provided increases. As the time necessary to decide the packet accumulate FIFO which transmits the packet increases along with the number of the packet accumulate FIFOs, when a large number of user groups are to be accommodated the decision processing time necessary to decide the packet accumulate FIFO increases according to the number of the user groups to be accommodated. Therefore, there is a problem that when a large number of user groups are to be accommodated the bandwidth control can not be performed at high speed. Moreover, when a large number of user groups are to be accommodated, as a large number of packet accumulate FIFOs become necessary, there is another problem that the cost to maintain the packet accumulate FIFOs increases proportionally to the number of the accommodated user groups.

If the packets which belong to different kinds of user groups are buffered using a general purpose large memory in stead of the FIFO, in principle there would be no need to provide packet accumulate FIFOs according to the user groups, but the process to decide from which user group a packet should be fetched would be needed. Consequently, the process becomes complicated and as the reading speed of the memory is not high, therefore high speed bandwidth control can not be implemented.

Also, the technique described in the prior art 2 is a technique to discriminate the received packet to be a high priority packet, a low priority packet or a discard packet using the bandwidth policing result, it can not solve the above-mentioned problems even if it is combined with the leaky bucket algorithm described in the prior art 1.

SUMMARY OF THE INVENTION

A first object of the present invention is to solve the problems of the prior art 1 and to provide a high speed bandwidth policing apparatus which can accommodate a large number of user groups consisting of a plurality of users and can perform bandwidth policing for each user group as well as performing bandwidth policing for each user. Further, the object is to obtain the effect of reducing the accommodation cost per user group by accommodating a large number of user groups using the present bandwidth policing apparatus.

A bandwidth policing apparatus according to the present invention includes a bandwidth policing unit for each user which performs bandwidth policing of contracted bandwidth for each user to which a packet belongs, and a bandwidth policing unit for each user group which performs bandwidth policing of contracted bandwidth for each user group which consists of a plurality of users, wherein packets of not only a plurality of users but also a plurality of user groups are accumulated in the same packet accumulate FIFO. According to the bandwidth policing apparatus, as the packets are always output from one packet accumulate FIFO even when the number of user groups to be accommodated increases and thus there is no need to select a packet accumulate FIFO to output a packet from a plurality of packet accumulate FIFOs, even if the number of user groups to be accommodated increases the bandwidth policing can be performed at high speed.

Here, the contracted bandwidth does not necessarily need to be for each user or for each user group, generally it can be for each flow which is identified from at least one information of address information of input packet, information to identify the use, or network priority which is information to identify the priority within a network, or for each flow group which consists of a plurality of flows. In this case, the bandwidth policing apparatus of the present invention includes a flow detect unit which detects a flow to which a packet belongs, a flow group detect unit which detects a flow group to which the detected flow belongs, a bandwidth policing unit for each flow to police contracted bandwidth for each flow detected by the flow detect unit, and bandwidth policing unit for each flow group to police contracted bandwidth for each flow group detected by the flow group detect unit, wherein packets of a plurality of flow groups are accumulated in the same packet accumulate FIFO.

Other objects, features and advantages of the invention will become apparent from the following description of the embodiments of the invention taken in conjunction with the accompanying drawings.

BRIEF DESCRIPTION OF THE DRAWINGS

FIG. 11 is a format of a flow bandwidth policing table.

FIG. 12 is format of a flow group bandwidth policing table.

DESCRIPTION OF THE EMBODIMENTS

Another problem newly rises when the above-mentioned bandwidth control is performed applying the discrimination standard of packet described in the prior art 2 to the shaper of the prior art 1. At the bandwidth policing unit 130 the committed information rate for each user is policed and a packet within the committed information rate is decided to be a high priority packet and its queuing priority for the packet accumulate FIFO 120 is set to high, and a packet which exceeds the committed information rate for each user is decided to be a low priority packet and its queuing priority is set to low. Additionally, at the bandwidth policing unit 130 the peak information rate for each user group is policed and a packet which exceeds the peak information rate is discarded.

The problem in this case will be explained referring to FIG. 4A.

Figure 4A:
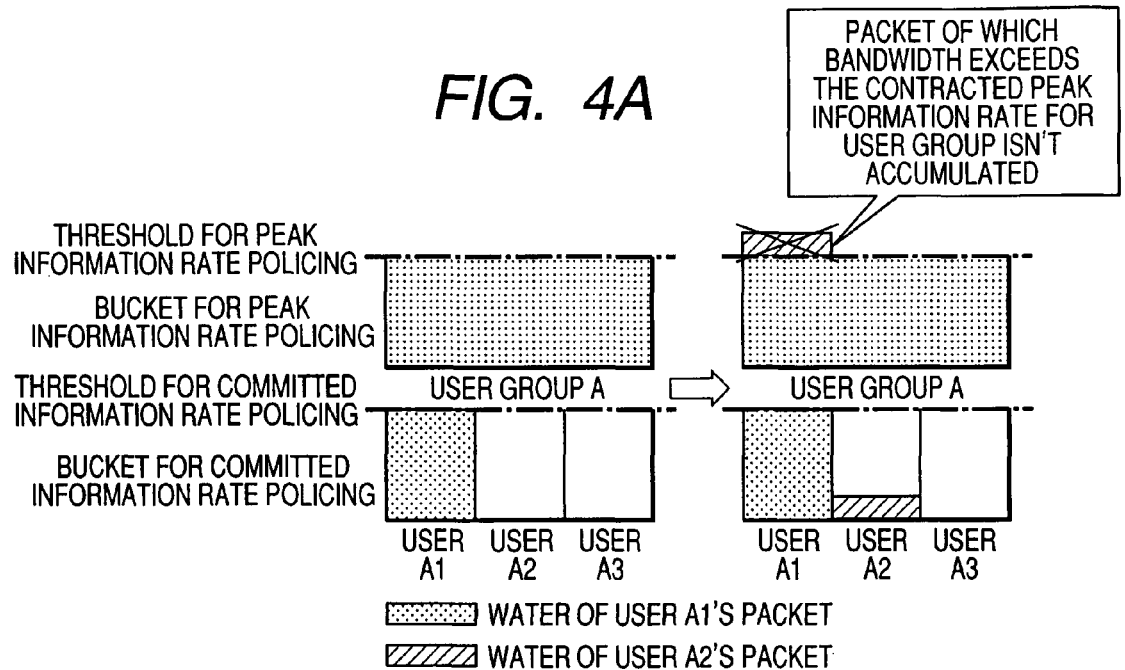
FIG. 4A is a diagram showing a problem when the prior art 2 and the leaky bucket algorithm are combined.

First, consider the situation in which among the users A1~A3 only the user A1 is communicating as in the left figure of FIG. 4A, and it is assumed that the user A1 is communicating using up the contracted committed information rate for each user and further occupying the peak information rate for user group A using the extra bandwidth unused by other users which belong to the user group A. At this point if a packet of the user A2 begins to be input, the bandwidth of the packet exceeds the bucket threshold of the user group A as in the right figure of FIG. 4A. In the prior art 2, as the peak information rate is decided first, although the packet of the user A2 has not used up the committed information rate for each user, it is decided that the bandwidth of the packet exceeds the peak information rate for each user group and consequently the packet is discarded. In this manner, when the peak information rate policing which binds a plurality of users is logically pre-decided in the prior art 2, there rises a problem that the committed information rate for each user can not necessarily be guaranteed.

A packet transfer apparatus according to the present invention, wherein for a packet which flows into a network when all of the contracted bandwidth for each flow group are used, when the packet does not exceed or violate the contracted bandwidth for each flow to which the packet belongs, the contracted bandwidth for each flow is guaranteed by deciding that the packet does not exceed the contracted bandwidth for each flow group, and also, the excess bandwidth in amount of the packet which exceeds the contracted bandwidth for each flow group is stored as excess bandwidth information. On the other hand, when the packet exceeds the contracted bandwidth for each flow to which the packet belongs, by subtracting the excess bandwidth stored as excess bandwidth information from the contracted bandwidth for each flow group and performing bandwidth policing for each flow group, the bandwidth exceeding the contracted bandwidth for each flow group is prevented from being allocated as the bandwidth summation of the packet which exceeds the contracted bandwidth for each flow and the packet which does not exceed the contracted bandwidth for each flow.

Figure 4B:
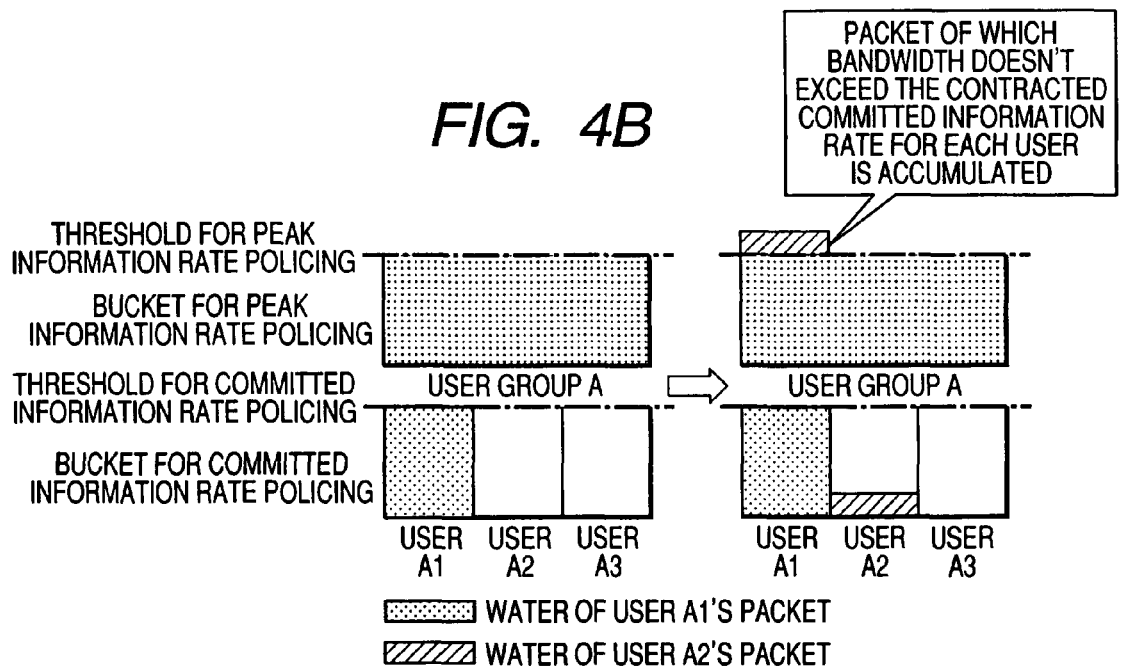
FIG. 4B is a diagram showing the solution of the problem of the prior art 2 by water of a bucket of the leaky bucket algorithm according to the present invention.

The reason why the problem of the prior art 2 is solved by this is as following. As an example, it will be described the case where an algorithm of the bandwidth policing is the leaky bucket algorithm. First, it is assumed that the user A1 has used up the committed information rate for each user and is communicating further occupying up to the peak information rate of the user group A using the extra bandwidth as in the left figure in FIG. 4B. At this point if a packet of the user A2 begins to be input, the bandwidth of the packet exceeds the bucket threshold of the user group A as in the right figure of FIG. 4B. In the prior art 2, as the peak information rate decision is performed logically first, the packet of the user A2 is decided to have exceeded the peak information rate and is discarded, and consequently the committed information rate for the user A2 is not necessarily guaranteed.

Figure 5A:
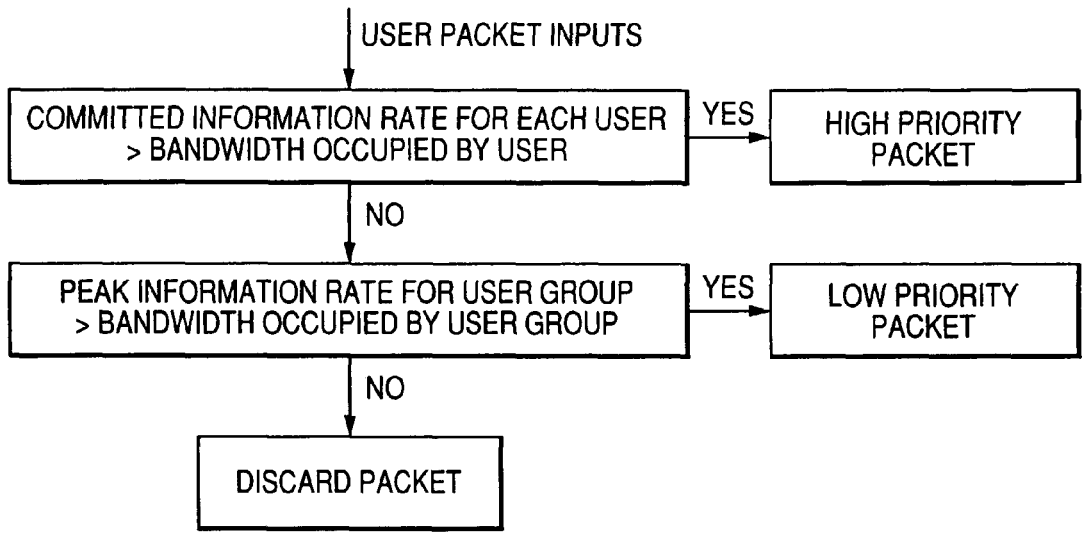
FIGS. 5A and 5B are diagrams showing the solution of the problem of the prior art 2 by water of a bucket of the leaky bucket algorithm.
Figure 5B:
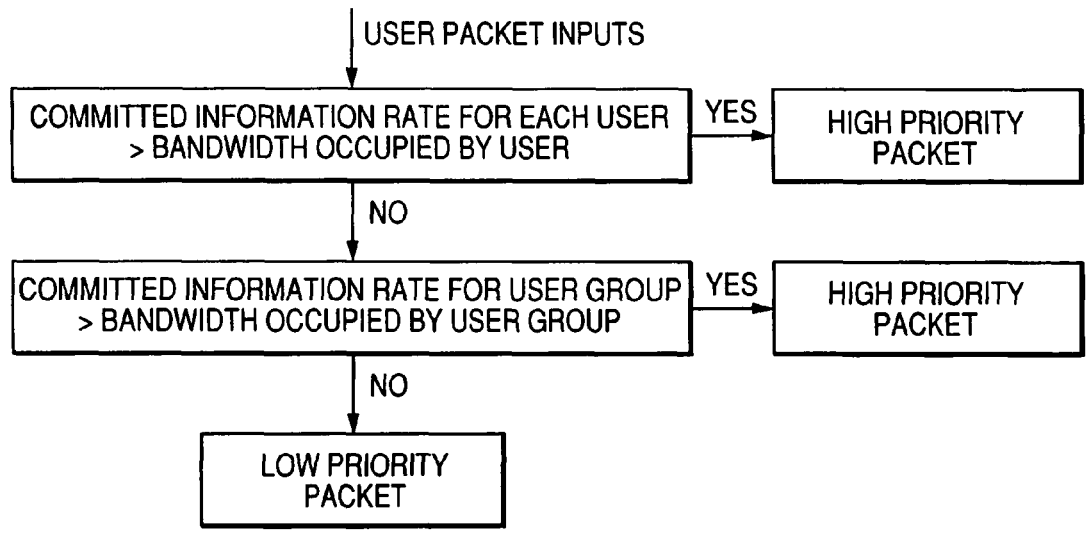

However, according to the present invention, in case where the contracted bandwidth for each user group is a peak information rate is like in FIG. 5A, in case where the contracted bandwidth for each user group is a committed information rate is like in FIG. 5B, first, the decision of the committed information rate which is the contracted bandwidth for each user is performed logically first. Then, when a packet of the user A2 begins to be input, as the bandwidth of the packet does not exceed the contracted bandwidth for the user A2 and consequently it is decided that the bandwidth of the packet does not exceed the contracted bandwidth of the user group A, not only an amount of water corresponding to the packet is to be accumulated in a bucket of the user A2, but also the same amount of water is to be accumulated in a bucket of the user group A overflowing the threshold. Therefore, the contracted bandwidth for the user A2 is guaranteed invariably.

On the other hand, if a packet of the user A1 is input in this situation, the bandwidth of the packet exceeds the contracted bandwidth of the user A1, and further is regarded to exceed the contracted bandwidth of the user group A, therefore it is discarded according to the peak information rate limitation of the user group A. In this manner, when a packet of a user of which bandwidth does not exceed the contracted bandwidth for each user and a packet of which bandwidth exceeds the contracted bandwidth for each user conflict, the packet of which bandwidth does not exceed the contracted bandwidth for each user is decided not to exceed the contracted bandwidth for each user group and is accumulated in the bucket for each user group. On the other hand, as the packet of which bandwidth exceeds the contracted bandwidth for each user is decided to exceed the contracted bandwidth for each user group, it is not accumulated in the bucket for each user group. Therefore, the packet of which bandwidth does not exceed the contracted bandwidth for each user does not exceed the contracted bandwidth for each user group either and its committed information rate is guaranteed invariably, on the contrary, the packet of which bandwidth exceeds the contracted bandwidth for each user is discarded with high priority when it exceeds the contracted bandwidth for each user group, thus, the bandwidth usage is adjusted between the user who have used up the contracted bandwidth for the user and the user who have not used up the contracted bandwidth for the user.

Here, in the present invention it is necessary to make the contracted bandwidth for each user group equal to or greater than the total sum of the contracted bandwidths for respective users belonging to the user group. The reason is that in case where the contracted bandwidth for each user group is less than the total sum of the contracted bandwidths for users, if all the users continue to transmit packets using all the contracted bandwidth for each user, the bucket which polices the bandwidth of the user group continues to overflow and the state in which the contracted bandwidth for each user group is exceeded continues constantly. In case where the contracted bandwidth for each user group is equal to or greater than the total sum of the contracted bandwidths for users, even when a packet of which bandwidth does not exceed the contracted bandwidth for each user is exceedingly accumulated in the bucket for each user group, the water continues to leak from the bucket for each user group in the bandwidth equal to or greater than the contracted bandwidth for each user. Further, in the bandwidth policing for each user group of a packet of which bandwidth exceeds the contracted bandwidth for each user, the above-mentioned excess bandwidth in the amount exceedingly accumulated in the bucket for each user group is subtracted from the contracted bandwidth for each user group. Therefore, for the packet of which bandwidth exceeds the contracted bandwidth for each user, as the bandwidth in the amount of which a packet of which bandwidth does not exceed the contracted bandwidth for each user has exceeded is not allocated as the bandwidth occupied by user, the bandwidth which exceeds the contracted bandwidth for each user group is prevented from being allocated as the bandwidth summation of the packet which exceeds the contracted bandwidth for each user and the bandwidth of the packet which does not exceed it.

As examples of the contracted bandwidth for each user and the contracted bandwidth for each user group, for example, the committed information rate guaranteed for each user can be used as contracted bandwidth for each user and the contracted bandwidth for each user group can be the total sum of the committed information rates guaranteed for respective users which belong to the user group. In this case, when there is any extra bandwidth in the contracted bandwidth for each user group the bandwidth policing can be performed so that the extra bandwidth can be used effectively as well as guaranteeing invariably the committed information rate for each user.

Also, the committed information rate guaranteed for each user can be used as contracted bandwidth for each user, and the contracted bandwidth for each user group can be the peak information rate which is desirable to be limited as user group. In this case, when there is any extra bandwidth limiting the peak information rate as user group, the bandwidth policing can be performed so that the extra bandwidth can be used effectively as well as guaranteeing invariably the committed information rate for each user.

In this case also, the contracted bandwidth does not necessarily need to be for each user or for each user group, generally it can be for each flow which is identified from at least one information of address information of input packet, information to identify the use, or network priority which is information to identify the priority within a network, or for each flow group which consists of a plurality of flows.

Figure 6:
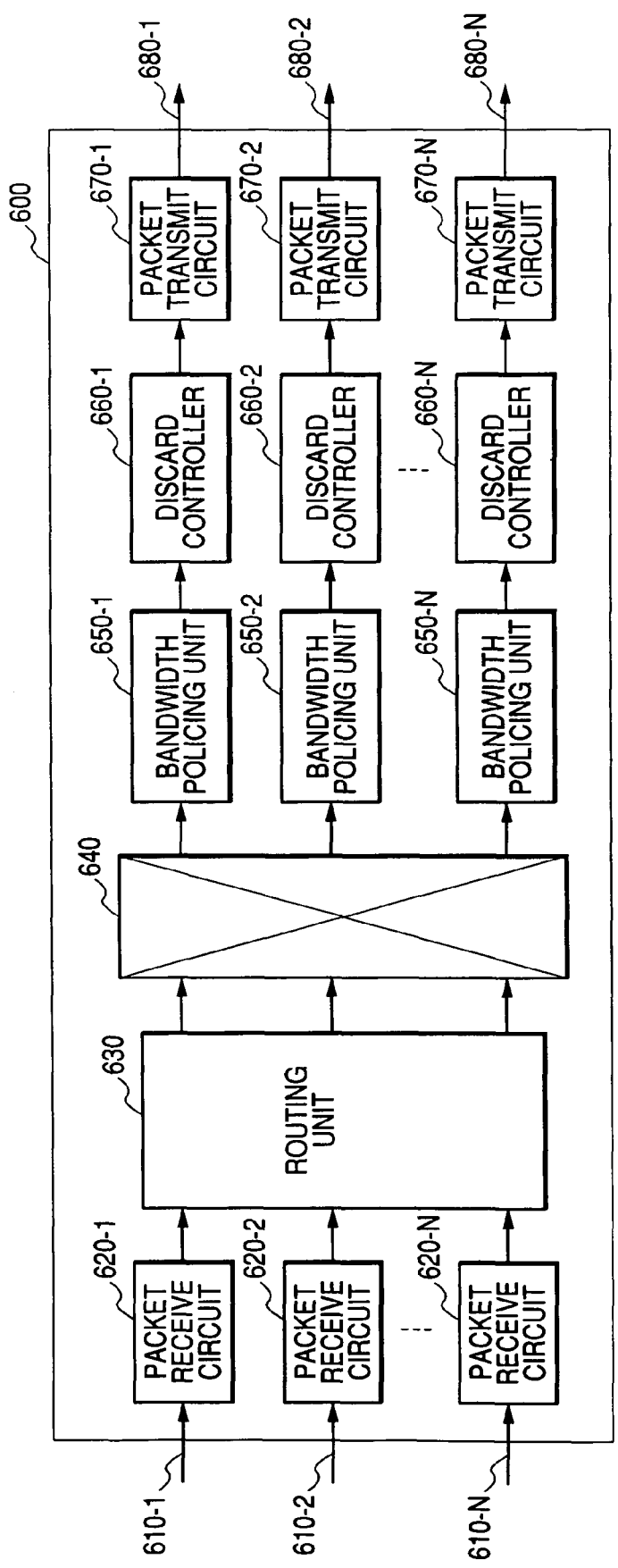
FIG. 6 is a block diagram of a packet transfer apparatus to which the present invention is applied.

First, the schematic configuration of a packet transfer apparatus to which the present invention is applied will be described referring to FIG. 6. A packet transfer apparatus 600 is configured by N input circuits 610-$i$ ($i$=1~N) on which packets are input, packet receive circuits 620-$i$ which perform receive processing of packets, a routing unit 630, a packet switching unit 640 which performs switching of packets, bandwidth policing units 650-$j$ ($j$=1~M) for each output circuit, discard controllers 660-$j$, packet transmit circuits 670-$j$ which perform transmit processing, and N output circuits 680-$j$ on which packets are output.

Figure 1:
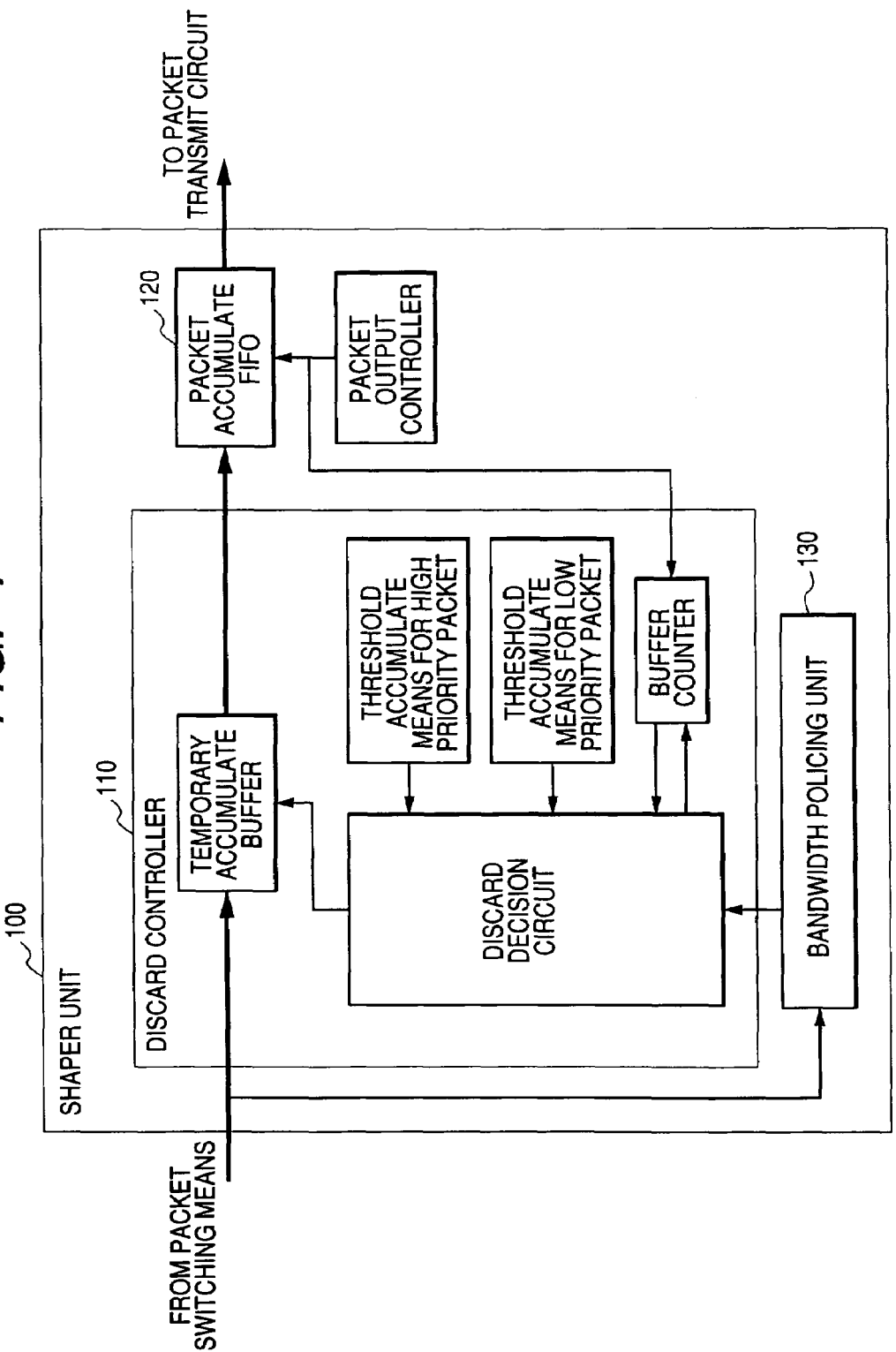
FIG. 1 is a block diagram showing the configuration of a shaping apparatus according to the prior art 1.
Figure 2:
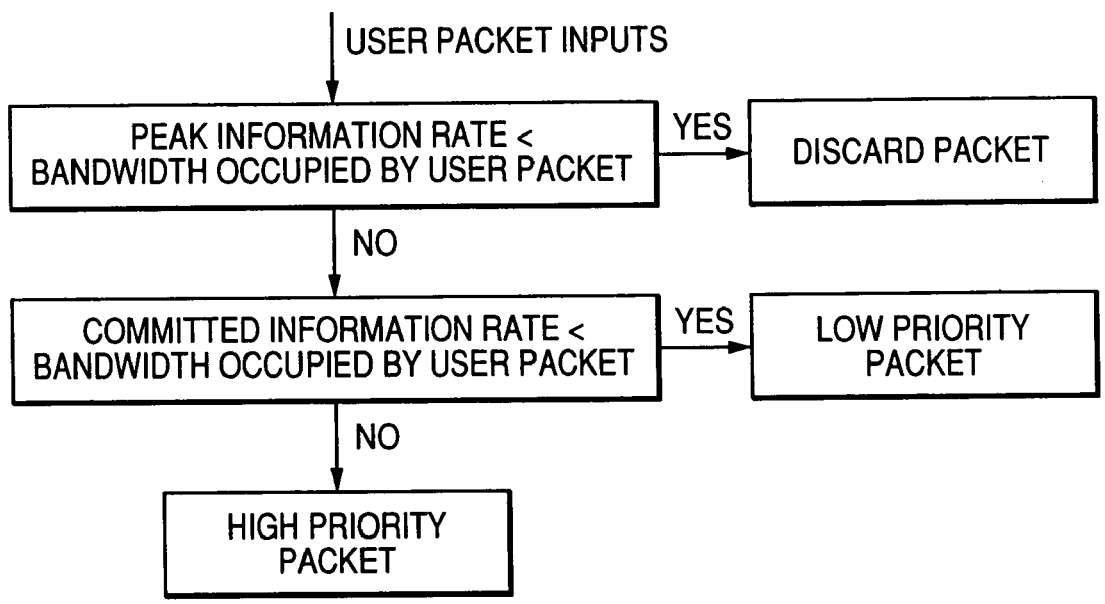
FIG. 2 is a flow chart of a bandwidth policing method according to the prior art 2.
Figure 3:
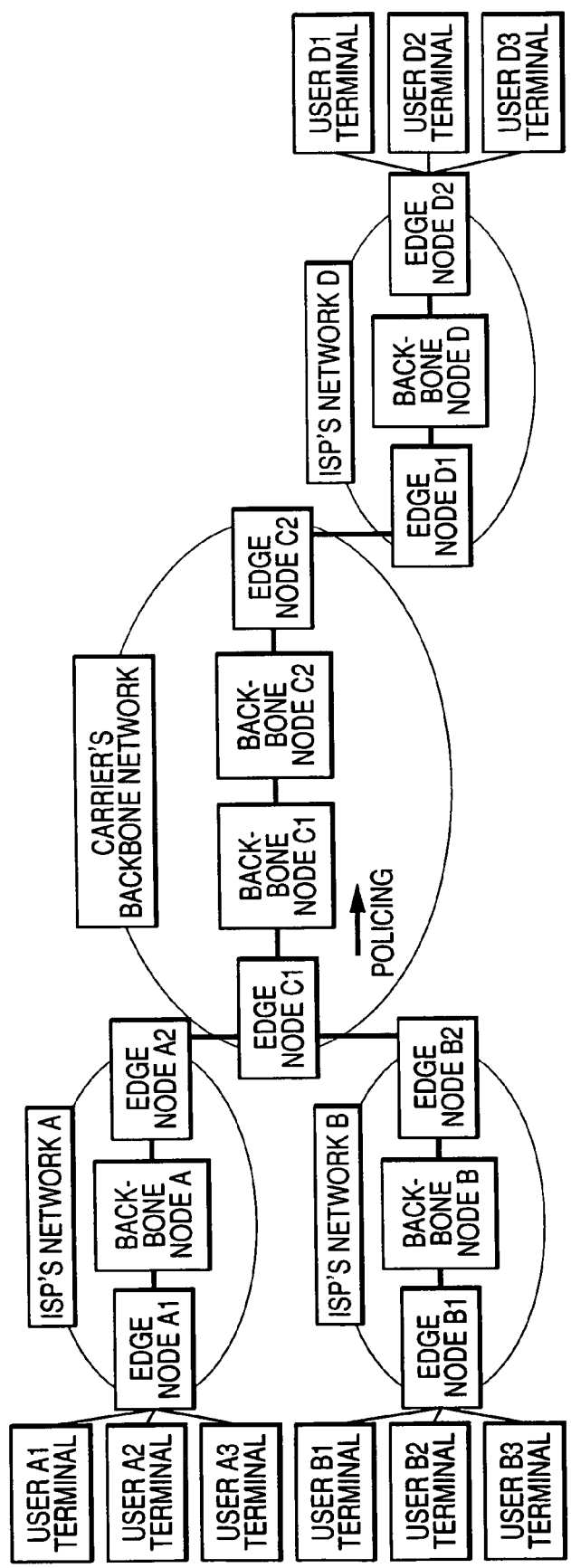
FIG. 3 is a diagram showing an example of the configuration of a network assumed by the present invention.
Figure 7:
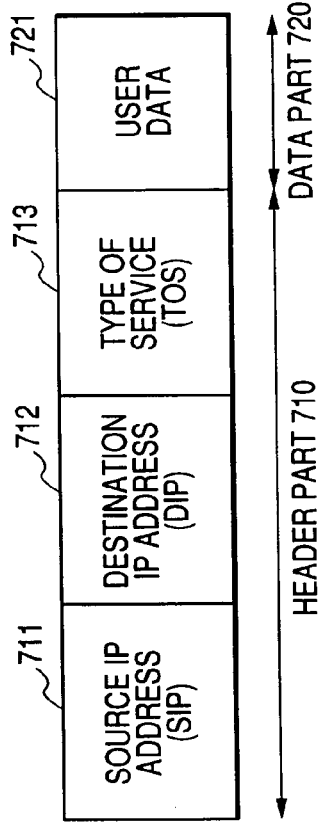
FIG. 7 is a diagram showing a header and data configuration of a packet on the network of FIG. 3.

FIG. 7 shows an example of a format of a packet in the IP network shown in FIG. 3 assumed by the present invention. A packet consists of a header part 710 and a data part 720. The header part 710 consists of Source IP address (hereinafter it is called "SIP") 711, Destination IP address (hereinafter it is called "DIP") 712 and Type of Service (hereinafter it is called "TOS") 713. And, the data part 720 consists of user data 721. In the header part 710 information such as Time to Live (TTL) is also stored in addition to the above-mentioned information, but the process which will be described below can be performed in the same way as the above-mentioned information.

Figure 8:
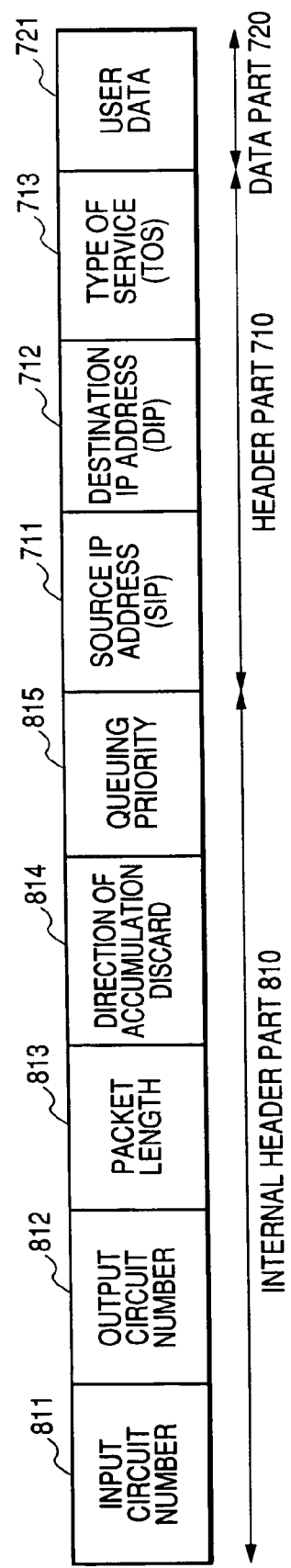
FIG. 8 is a diagram showing the configuration of a packet in the packet transfer apparatus of FIG. 6.
Figure 9:
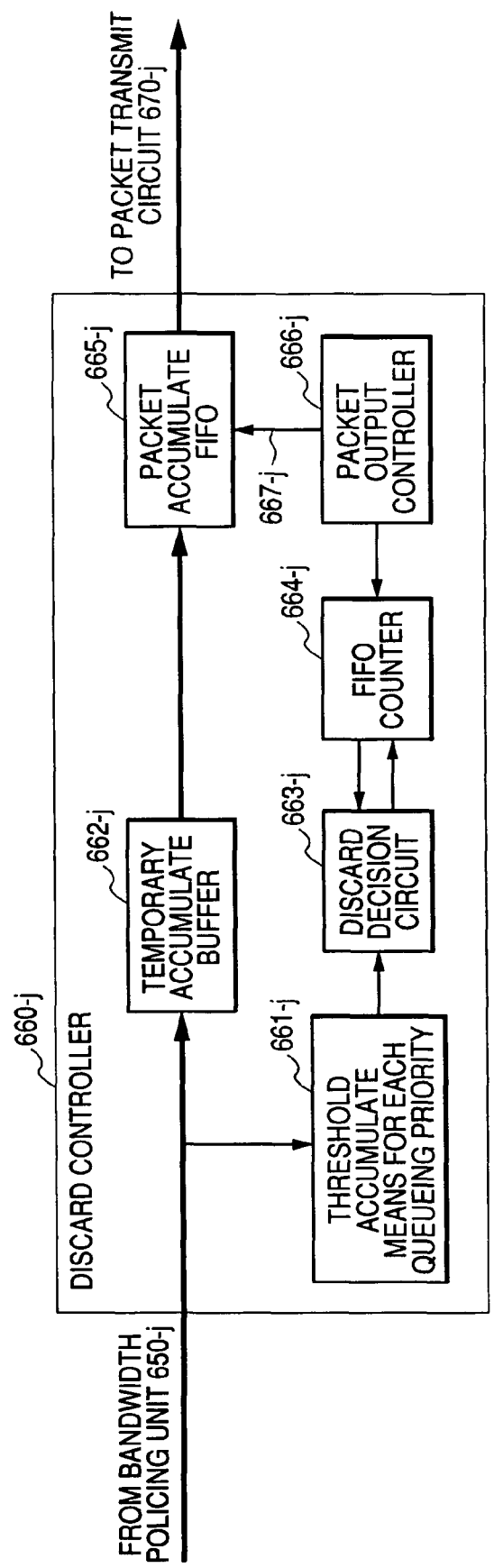
FIG. 9 is a block diagram of a discard controller in the packet transfer apparatus of FIG. 6.

FIG. 8 shows an example of a format of a packet within the packet transfer apparatus 600 to which the present invention is applied. For the format of a packet within the packet transfer apparatus 600 an internal header part 810 is added to the format of a packet of the IP network. The internal header part 810 consists of input circuit number 811 which is an identifier of a circuit on which a packet is input, output circuit number 812 which is an identifier of a circuit on which a packet is output, packet length 813 which indicates the byte length of a packet, direction of accumulation and discard 814 which directs packet accumulation and discard for the packet accumulate FIFO 665-$j$ in the discard controller 660-$j$ which is directed as a result of the bandwidth policing, and queuing priority 815 for the packet accumulate FIFO 665-$j$.

Next, the schematic operation of the packet transfer apparatus to which the present invention is applied will be described referring to FIG. 6. When a packet is input from the input circuit 610-$i$ of the packet transfer apparatus 600, the packet receive circuit 620-$i$ adds the internal header 810 and writes the packet length 813 (in byte unites) after calculating the byte length of the packet. Further, it writes the input circuit 610-$i$ in which the packet is input to the field for the input circuit number 811, and transmits the packet to the routing unit 630. Here, at this point the output circuit number 812 is a meaningless value. On receiving the packet the routing unit 630 decides the output circuit 680-$j$ to output the packet based on the DIP 712, writes the circuit number j of the output circuit 680-$j$ to the field for the output circuit number 812 and transmits the packet to the packet switching unit 640. The packet switching unit 640 performs switching of the packet according to the output circuit number 812 and transmits the packet to the bandwidth policing unit 650-$j$ for each output circuit.

The bandwidth policing unit 650-$j$ detects the user to which the packet belongs and the user group to which the packet belongs based on the SIP 711, performs the bandwidth policing for each user and the bandwidth policing for each user group, and further, when there is any extra bandwidth in the bandwidth for each user group, performs the bandwidth policing so that it can be used effectively as well as guaranteeing invariably the contracted committed information rate for each user. The detailed operation of the bandwidth policing unit 650-$j$ will be described later. For the packet of which bandwidth is policed, it writes the direction of accumulation and discard for the packet accumulate FIFO 665-$j$ in the discard controller 660-$j$ as directed as a result of the bandwidth policing in the field for the direction of accumulation and discard 814, writes the queuing priority for the packet accumulate FIFO 665-$j$ in the field for the queuing priority 815, and transmits the packet to the discard controller 660-$j$.

The packet transmitted to the discard controller 660-$j$ is once accumulated in a temporary accumulate buffer 662-$j$. Based on the direction of accumulation and discard 814 of the packet transmitted from the bandwidth policing unit 650-$j$, when "discard" is directed, the packet is not transmitted from the temporary accumulate buffer 662-*j* to the packet accumulate FIFO 665-*j*. Then, information of a packet which arrived to the discard controller 660-*j* next to the packet decided to be "discard" is rewritten. When "accumulation" is directed, the threshold of the packet accumulate FIFO 665-*j* for the queuing priority 815 is referenced from threshold accumulate means 661-*j* for each queuing priority and the threshold is compared with the value of a FIFO counter 664-*j*. If the threshold is greater than the FIFO counter 664-*j*, the packet is decided to be "accumulation" and 1 is added to the value of the FIFO counter 664-*j*, and also, the packet is transmitted to the packet accumulate FIFO 665-*j*. If the threshold is less than or equal to the FIFO counter 664-*j*, the packet is decided to be "discard" and the packet is not transmitted to the packet accumulate FIFO 665-*j* nor 1 is added to the value of the FIFO counter 664-*j*. Then, information of a packet which arrived to the discard controller 660-*j* next to the packet decided to be "discard" is rewritten.

A packet output controller 666-*j* transmits a packet transmit activate signal 667-*j* so that the packets are to be transmitted within the circuit bandwidth in order that they are accumulated in the packet accumulate FIFO 665-*j*, and the packet accumulate FIFO 665-*j* receiving the signal transmits a packet to a packet transmit circuit 670-*j*. Also, on receiving the packet transmit activate signal 667-*j*, the FIFO counter 665-*j* subtracts 1 from the FIFO counter 665-*j*. In the present invention, the packet output controller 666-*j* transmits the packet transmit activate signal 667-*j* so that the packets are transmitted within the circuit bandwidth, but the packets may be transmitted in the bandwidth less than or equal to the circuit bandwidth (e.g., half of the circuit bandwidth) set by the network operator. The packet transmitted to the packet transmit circuit 670-*j* is transmitted to the output circuit 680-*j* after being removed the internal header 810.

In the bandwidth policing unit 650-*j*, the direction of discard for the packet of which bandwidth exceeds the contracted bandwidth for each user group or the direction of rewrite of the type of service 713 or the queuing priority 815 are made by performing the bandwidth policing for each user and the bandwidth policing for each user group. Therefore, the bandwidth control for each user and for each user group can be made by performing the discard control according to the direction of discard in the discard controller 660-*j* or the queuing priority 815. As the packets are transmitted from one packet accumulate FIFO 665-*j* without having packet accumulate FIFOs 665-*j* for respective user groups, there is no need to select one FIFO for transmission from a plurality of FIFOs, then the bandwidth control can be performed at high speed.

The configuration of the network assumed in the present embodiment is as shown in FIG. 3. The network has the bandwidth policing unit on the output side of the edge node C1 where communication data from the ISP's network A and the ISP's network B congest, polices the bandwidth for each user of users A1~A3, and guarantees the contracted bandwidth for each user MA1~MA3 as the committed information rate. Also, it polices the bandwidth of the user group A which consists of users A1~A3 and if there is any user that does not use the bandwidth for each user, it can provide other users with the unused contracted bandwidth for each user as guaranteed bandwidth. For example, when the users A2 and A3 are not communicating, the user A1 can use the guaranteed bandwidth up to the contracted bandwidth of the user group A MA=MA1+MA2+MA3.

The contracted bandwidth MA of the user group A can select either of the committed information rate guaranteed as a user group, or the peak information rate limited as a user group. When MA is set to be the committed information rate, there is no sanction to the packet of which bandwidth exceeds the contracted bandwidth for each user, and as a sanction to the packet of which bandwidth exceeds the contracted bandwidth for each user group, the type of service 713 or the queuing priority 815 is rewritten. When MA is set to be the peak information rate, there is no sanction to the packet of which bandwidth exceeds the contracted bandwidth for each user or the type of service 713 or the queuing priority 815 is rewritten as a sanction, and the sanction to the packet of which bandwidth exceeds the contracted bandwidth for each user group is to be discarded. Also, for the user group B which consists of users B1~B3 of the ISP's network B the same bandwidth policing is assumed to be performed.

Next, the detailed operation of the bandwidth policing unit 650-*j* will be described. As a bandwidth policing algorithm the leaky bucket algorithm is used as the bandwidth policing algorithm extended to the variable length packet of the IP. The leaky bucket algorithm is a model of a leaky bucket which has a certain depth and a hole, and while the bucket contains water in it the water continues to leak in policed bandwidth, and when a packet is input water in an amount of byte length of the packet is poured. The bucket has a certain depth to allow an arrival swing of packet, and while the bucket does not overflow the input, the packet is handled as packet of which bandwidth does not exceed the contracted bandwidth, and when the bucket overflows, the packet is handled as a packet of which bandwidth exceeds the contracted bandwidth.

Figure 10:
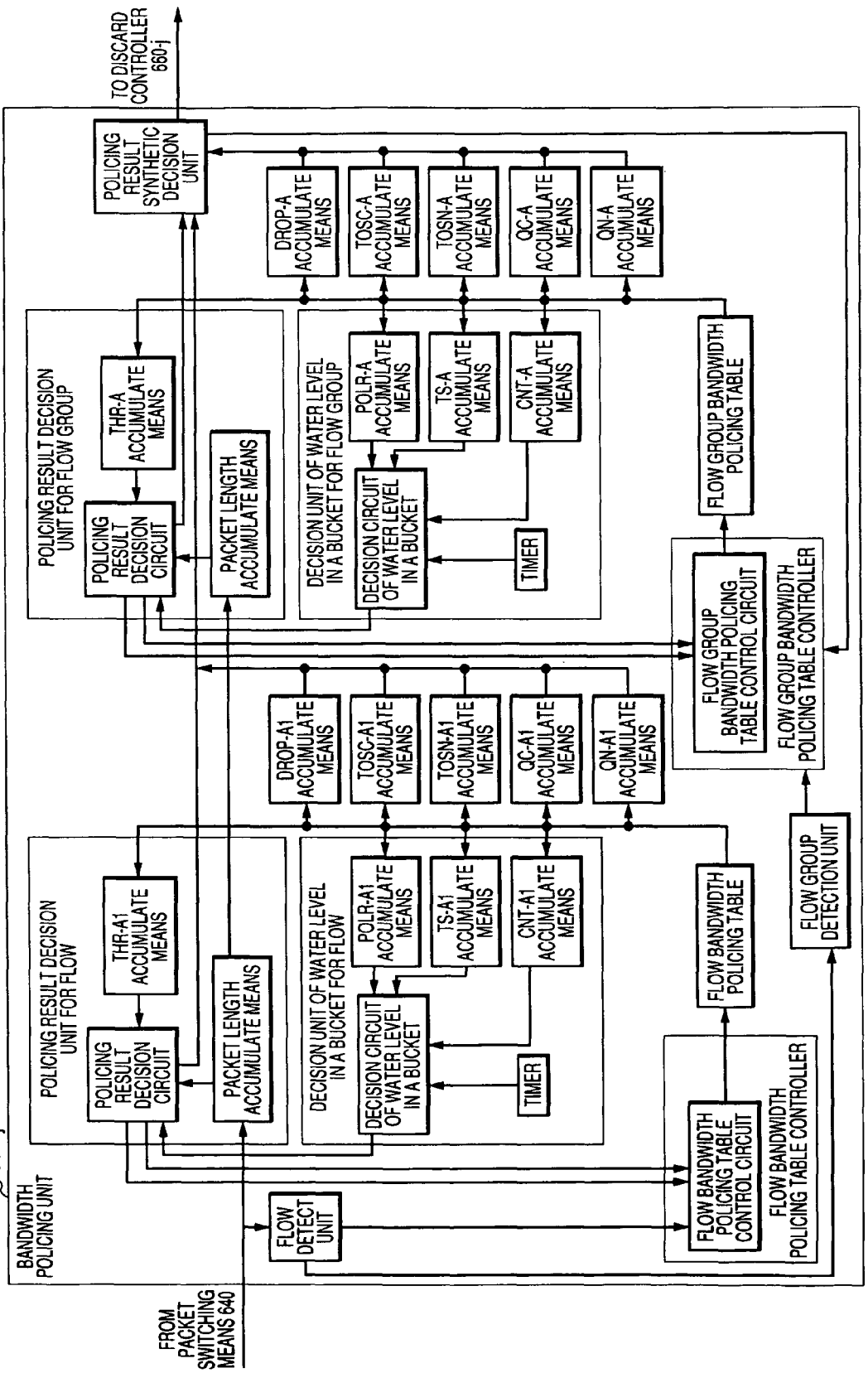
FIG. 10 is a block diagram of a bandwidth policing unit of the present invention.

FIG. 10 shows a block diagram of the bandwidth policing unit 650-*j*. The bandwidth policing unit 650-*j* is configured by a flow detect unit, a flow bandwidth policing table controller, a decision unit of water level in a bucket for flow, a policing result decision unit for flow, a flow group detection unit, a flow group bandwidth policing table controller, a decision unit of water level in a bucket for flow group, a policing result decision unit for flow group, and a policing result synthetic decision unit. A format of the flow bandwidth policing table is shown in FIG. 11 and a format of the flow group bandwidth policing table is shown in FIG. 12. Each of 11-1~11-6 is a flow bandwidth policing entry corresponding to from the user A1 to the user B3 respectively, 12-1 is a flow group bandwidth policing entry for user group A, 12-2 is a flow group bandwidth policing entry for user group B. THR is the depth of bucket, POLR is policing bandwidth, TS is arrival time of previous packet, CNT is water level of bucket which indicates an amount of water accumulated in a bucket, TOSC is a type of service when the bandwidth of the packet does not exceed the contracted bandwidth, TOSN is a type of service when the bandwidth of the packet exceeds the contracted bandwidth, QC is a queuing priority when the bandwidth of the packet does not exceed the contracted bandwidth, QN is a queuing priority when the bandwidth of the packet exceeds the contracted bandwidth, and DROP indicates "discard" or "accumulation" when the bandwidth of the packet exceeds the contracted bandwidth. The flow detect unit decides the flow identifier from SIP 711 among information in the packet header to perform flow bandwidth policing. The flow bandwidth policing table controller references the flow bandwidth policing entry corresponding to the flow identifier, reads out parameters of THR, POLR, TS, CNT, TOSC, TOSN, QC, QN and DROP which are necessary for bandwidth policing, and accumulates them in THR accumulate means, POLR accumulate means, TS accumulate means, CNT accumulate means, TOSC accumulate means, TOSN accumulate means, QC accumulate means, QN accumulate means, and DROP accumulate means, respectively. Below, the case where the flow belongs to the user A1 and the flow group belongs to the user group A will be described.

At the decision unit of water level in a bucket for flow, the amount of water in the bucket immediately before a packet is input is decided. First, a decision circuit of water level in a bucket calculates the difference between the value of a timer which counts the current time and the TS-A 1 of the TS accumulate means, and calculates the time elapsed which passed from when water was accumulated in the bucket the last time. Next, it multiplies the time elapsed by the POLR-A1 in the POLR accumulate means and calculates the amount of water which leaked from when water was accumulated in the bucket the last time. Further, it subtracts the reduced amount of water in the bucket from the CNT-A1 in the CNT accumulate means, and decides the water level in the bucket which is the amount of water immediately before a packet is input. Then it decides the positive or negative of the water level in the bucket and, if the decision result is negative, modifies the water level in the bucket to 0.

A policing result decision circuit in the policing result decision unit for flow decides whether water in an amount corresponding to the packet length of the input packet can be poured in the bucket or not. First, it adds the packet length to the water level in the bucket and compares this with the THR-A1 in the THR accumulate means. When the water level in the bucket+the packet length is greater than the THR-A1, as when the water corresponding to the packet length is input the bucket will overflow, the input packet is decided to be a packet of which bandwidth exceeds the contracted bandwidth and the decision result is transmitted to the policing result synthetic decision unit. When the water level in the bucket+ the packet length is less than or equal to the THR-A1 the input packet is decided to be a packet of which bandwidth does not exceed the contracted bandwidth and the decision result is transmitted to the policing result synthetic decision unit.

Also in the decision unit of water level in a bucket for flow group the same process is repeated for the parameters read out from the flow group bandwidth policing table in the same way, and the decision result is transmitted to the policing result synthetic decision unit.

At the policing result synthetic decision unit, it decides the direction of accumulation and discard 814, the queuing priority 815, and the type of service 713 for the packet based on the decision result for flow and the decision result for flow group, and transmits them to the discard controller 660-*j*. Here, the case will be described where the contracted bandwidth for flow group is the committed information rate, there is no sanction for when a packet violates the bandwidth policing for flow (the same decision as when a packet keeps the bandwidth policing), and the sanction for when a packet violates the bandwidth policing for flow group is rewriting of the type of service and the queuing priority. For a packet with the decision result for flow is "keep" the direction is a direction of accumulation and TOSC-A1 and QC-A1 are transmitted to the discard controller 660-*j*. Also, for a packet with the decision result for flow is "violate" and the decision result for flow group is "keep", as there is no sanction for when a packet violates the bandwidth policing for flow, the direction is a direction of accumulation and TOSC-A1 and QC-A1 are transmitted to the discard controller 660-*j*. For a packet with the decision result for flow is "violate" and the decision result for flow group is "violate" the direction is a direction of accumulation and TOSC-A and QC-A are transmitted to the discard controller 660-*j*. Thereby, the committed information rate for each flow MAi (i=1~3) is invariably guaranteed, and also, for the user which exceeded the committed information rate for each flow, when there is any extra bandwidth in the committed information rate MA for the user group A it can be used effectively. Also, a packet which exceeded the committed information rate MA for the user group A is treated as a low priority packet in its own packet transfer apparatus or in the other packet transfer apparatuses in the network by rewriting the type of service or the queuing priority.

Further, if the decision result for flow bandwidth policing is "keep", the water level in the bucket+the packet length as a new water level in a bucket CNT-A1, and the value of the timer at the current time as new TS-A1 are transmitted to the flow bandwidth policing table controller, and they are written to the flow bandwidth policing entry of the user A1 before reading out the flow bandwidth policing table for the next input packet. In the same way, if the decision result for flow group bandwidth policing is "keep", also new CNT-A and TS-A are written in the flow group bandwidth policing table. Further, as process unique to the present invention, also when the decision result for flow group bandwidth policing is "violate", if the flow bandwidth policing result is "keep", new CNT-A and TS-A are written in the flow group bandwidth policing table as excess bandwidth information which indicates the amount of excess bandwidth.

Figure 13:
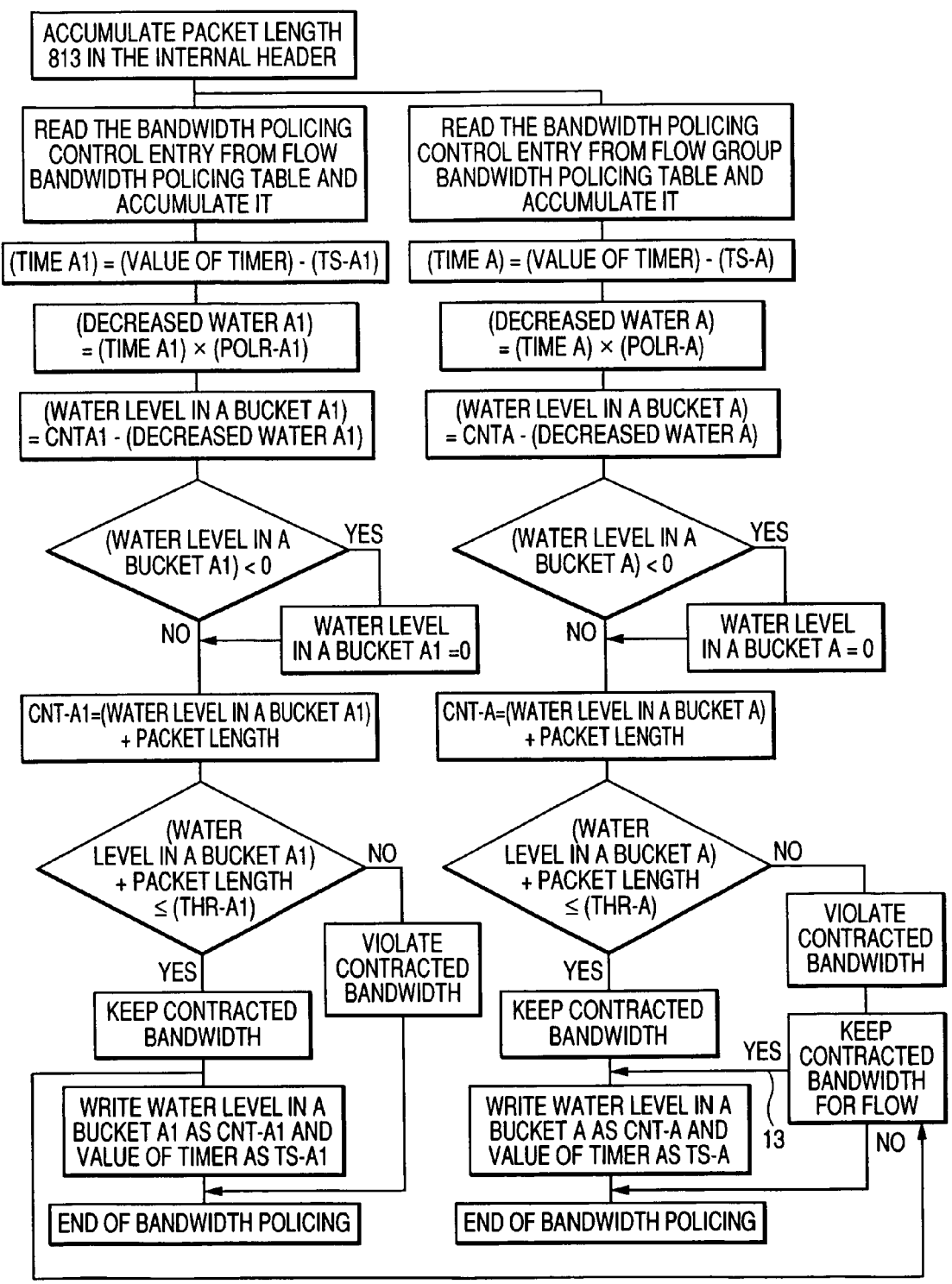
FIG. 13 is a flow chart of a bandwidth policing method of the present invention.

FIG. 13 shows a flow chart of the bandwidth policing algorithm. The process of 13, i.e. the process in which when the bandwidth policing decision result for each flow is "keep contracted bandwidth" new CNT-A and TS-A are written in the flow group bandwidth policing table as excess bandwidth information which indicates an amount of excess bandwidth, is the process unique to the present invention.

According to the present invention, a high speed bandwidth policing apparatus can be provided which performs bandwidth policing for each user and also can accommodate a large number of user groups which consist of a plurality of users and perform bandwidth policing for each user group. Further, by accommodating a large number of user groups using the present bandwidth policing apparatus, the accommodation cost per user group can be reduced.

Also, according to the bandwidth policing method of the present invention, the contracted committed information rate for each user is guaranteed invariably, and also, when there is any extra bandwidth in the bandwidth for each user group, it can be used effectively.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bandwidth policing method, for policing a packet which flows into a network that polices whether the packet exceeds a contracted bandwidth of a source of the packet, if the packet does not exceed the contracted bandwidth, judging the packet as a high priority packet, and if the bandwidth of the packet exceeds the contracted bandwidth, judging the packet as a low priority packet, the method comprising the steps of:

performing the bandwidth policing for a first flow, to which a first packet belongs, based upon whether the first packet exceeds a contracted bandwidth for the first flow;

performing the bandwidth policing for a flow group which consists of a plurality of flows, including the first flow and a second flow, based upon whether packets of the flows exceed a contracted bandwidth for the flow group;

if the first packet keeps the bandwidth policing performed for the first flow, even when the first packet violates the bandwidth policing performed for the flow group, judging the first packet as a high priority packet;

storing information of an excess bandwidth of the flow group in an amount of the first packet which exceeded the contracted bandwidth for the flow group; and if a second packet belonging to the second flow exceeds a contracted bandwidth for the second flow, performing the bandwidth policing for the flow group after subtracting the stored excess bandwidth from the contracted bandwidth for the flow group.

2. A bandwidth policing method according to claim 1, wherein a committed information rate guaranteed for each flow is used as the contracted bandwidth for flow, and a value equal to or greater than a total sum of the committed information rates guaranteed for flows which belong to the flow group is used as the contracted bandwidth for each flow group.

3. A bandwidth policing method according to claim 1, wherein a committed information rate guaranteed for flow is used as the contracted bandwidth for flow, and a peak information rate for the flow group is used as the contracted bandwidth for flow group.

4. A bandwidth policing method according to claim 3, wherein when a packet violates the committed information rate for flow and the peak information rate for flow group, the packet is discarded.

5. A bandwidth policing method according to claim 1, wherein a leaky bucket algorithm is used as an algorithm for bandwidth policing.

6. A bandwidth policing method according to claim 5, wherein in the bandwidth policing for each flow, if a packet is decided to keep the contracted bandwidth for flow, regardless of the depth of a bucket of the leaky bucket algorithm in the bandwidth policing for flow group, the packet is decided to keep the contracted bandwidth for each flow group and is accumulated in the bucket, with water accumulated in the bucket being the excess bandwidth information.

7. A bandwidth policing method according to claim 3, wherein when a packet violates the committed information rate for flow but follows the peak information rate for flow group, the packet is judged as a low priority packet.

* * * * *